M. VON RECKLINGHAUSEN.
MEANS FOR EXHAUSTING INCLOSED RECEIVERS.
APPLICATION FILED JULY 30, 1904.
946,068.  Patented Jan. 11, 1910.
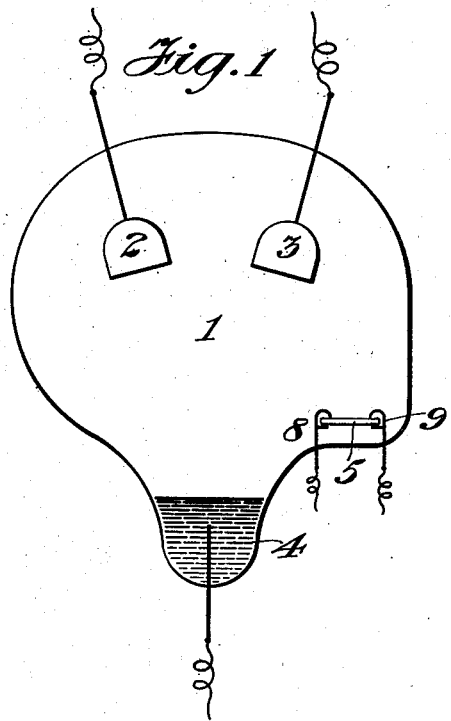
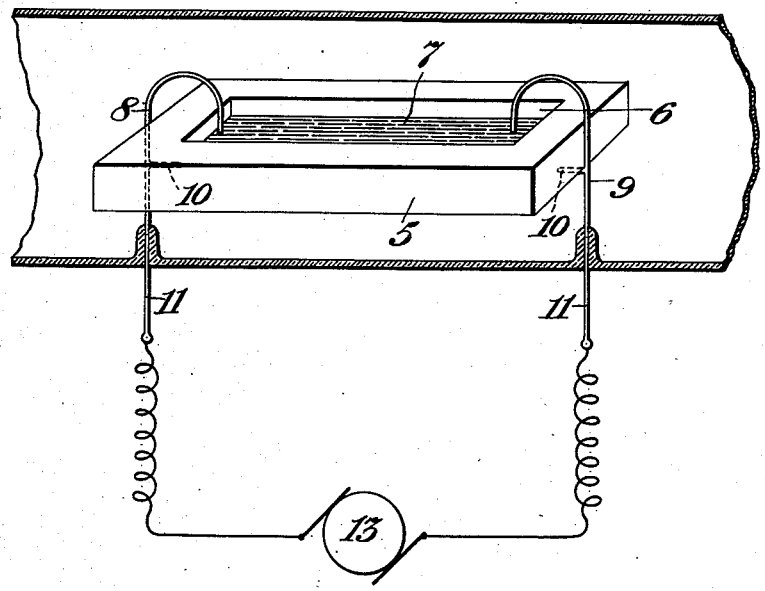

UNITED STATES PATENT OFFICE.

MAX VON RECKLINGHAUSEN, OF NEW YORK, N. Y., ASSIGNOR TO COOPER HEWITT ELECTRIC COMPANY, OF NEW YORK, N. Y., A CORPORATION OF NEW YORK.

MEANS FOR EXHAUSTING INCLOSED RECEIVERS.

946,068.

Specification of Letters Patent.    Patented Jan. 11, 1910.

Application filed July 30, 1904. Serial No. 218,831.

*To all whom it may concern:*

Be it known that I, MAX VON RECKLINGHAUSEN, a subject of the Emperor of Germany, and resident of New York, county of New York, State of New York, have invented certain new and useful Improvements in Means for Exhausting Inclosed Receivers, of which the following is a specification.

It has been found advantageous in exhausting containers of mercury vapor apparatus, whether designed for use as lamps or as vapor converters, to make use of magnesium for absorbing some of the gases which remain after a certain degree of exhaustion by pumping has been attained. A difficulty with the employment of magnesium for this purpose resides, however, in the fact that whereas the containing vessels for most of the mercury vapor apparatus are of glass, yet the magnesium in its active state attacks glass and, therefore, is less adapted for use in assisting the exhaustion than it would otherwise be. There are, however, ways in which the magnesium, particularly when made active through the action of heat, can be prevented from attacking the glass, and, of course, the injurious effects of the magnesium for the purpose indicated can be avoided, and excellent results obtained, by using a container which is not made of glass but of some metal such as iron.

My invention contemplates the use of magnesium or other metal for absorbing air or other purposes and the safeguarding of the same from the chances of doing injury, either by so mounting the magnesium or other metal in a glass container as to prevent its coming in contact when in a heated state with the material of the container, or by constructing the container wholly of some metal such as iron or some composition of metals not attackable by the heated magnesium or other metal.

In the drawings Figure 1 shows a mercury vapor converter in elevation; and Fig. 2 shows a section of a portion of the mercury vapor apparatus illustrating in perspective certain details of the apparatus common to the structure of Fig. 1 and Fig. 2.

In the drawing, Fig. 1 shows a mercury vapor converter comprising a container, 1, positive electrodes, 2 and 3, and a negative electrode, 4, of mercury. For convenience I will specify magnesium as the metal to be employed for absorbing air.

Inside the container 1 I mount, somewhat in the manner indicated, a plate or support, 5, of magnesia having a depression, 6, at its top in which a portion, 7, of magnesium is placed. With the terminals of the strip 7, I connect metallic wires or brackets 8, 9, provided with portions 10, 10, which extend under the plate 5 and support it in position.

The brackets 8 and 9 are connected with the lead-wires, 11, 11, which pass through the walls of the container 1 and are connected with the circuit wires leading to an electric generator, 13.

When used for the purpose indicated above, the apparatus is exhausted in the usual way. When, however, the exhaustion has been carried to a sufficiently high degree, the container may be sealed off and the generator 13 started into operation. Thereupon the strip 7 of magnesium will be heated or melted and in that state it will absorb the injurious nitrogen and oxygen remaining in the container, thus completing the exhaustion of the apparatus.

When it is desired to employ magnesium in order to secure a very high degree of exhaustion and without any danger of injury to the container, the latter may be made entirely of some metal or association of metals such as will not be attacked by magnesium in its active state. A metal suited for the purpose is iron.

I claim as my invention:—

1. The combination with a closed container, of a holder within the container, magnesium within the holder, and a source of electric current connected with the opposite ends of the magnesium whereby the same may be rendered active for absorbing injurious gases in the container.

2. The combination with a closed container, of an insulating holder inside the container, magnesium in the holder, and a source of electric current connected with the magnesium at points of different potential.

3. The combination with a closed container, of an insulating vessel inside the container adapted to hold a conducting liquid and a material in said vessel adapted to remove gases from the container, together with means for heating and melting said material.

Signed at New York, in the county of New York, and State of New York, this 22nd day of July A. D. 1904.

MAX VON RECKLINGHAUSEN.

Witnesses:
 WM. H. CAPEL,
 GEORGE H. STOCKBRIDGE.